United States Patent [19]

Whitworth et al.

[11] 4,202,040
[45] May 6, 1980

[54] DATA PROCESSING SYSTEM

[75] Inventors: Eddie L. Whitworth; Ronald G. Russell, both of Pacific Grove, Calif.

[73] Assignee: The United States of America as represented by the Secretary of the Navy, Washington, D.C.

[21] Appl. No.: 680,551

[22] Filed: Apr. 27, 1976

[51] Int. Cl.² .................... G06F 3/05; G06F 5/02
[52] U.S. Cl. ........................ 364/900; 340/347 DD
[58] Field of Search ......... 445/1; 340/172.5, 347 DD, 340/15.5 FC, 15.5 TS, 150, 151, 203, 347 AD; 178/17 R, 17.5, 26 R; 364/200 MS File, 900 MS File

[56] References Cited

U.S. PATENT DOCUMENTS

| 2,826,252 | 3/1958 | Dickstein | 340/347 DD X |
|---|---|---|---|
| 2,838,745 | 6/1958 | Wright et al. | 340/347 DD X |
| 2,994,076 | 7/1961 | Havens | 340/347 DD X |
| 3,145,374 | 8/1964 | Benner et al. | 340/203 |
| 3,241,134 | 3/1966 | Looschen | 178/26 R X |
| 3,281,793 | 10/1966 | Oeters et al. | 340/172.5 |
| 3,323,107 | 5/1967 | DuVall | 340/150 |
| 3,363,058 | 1/1968 | Moseley | 178/17.5 |
| 3,411,145 | 11/1968 | Cragon et al. | 340/172.5 |
| 3,421,151 | 1/1969 | Wong | 340/172.5 |
| 3,438,002 | 4/1969 | Murgio | 364/200 |
| 3,439,342 | 4/1969 | Barton | 340/172.5 |
| 3,465,302 | 9/1969 | Andrews et al. | 340/172.5 |
| 3,558,821 | 1/1971 | Lutz et al. | 178/17.5 |
| 3,577,142 | 5/1971 | McMillin | 340/347 DD |
| 3,582,901 | 6/1971 | Cochrane et al. | 364/200 |
| 3,599,205 | 8/1971 | Van Duuren et al. | 340/347 DD |
| 3,601,800 | 8/1971 | Lee | 340/146.1 E |
| 3,662,382 | 5/1972 | Janis | 178/17 R X |
| 3,665,417 | 5/1972 | Low et al. | 340/172.5 |
| 3,708,786 | 1/1973 | Hardin et al. | 340/172.5 |
| 3,740,721 | 6/1973 | Cline | 364/900 |
| 3,744,033 | 7/1973 | Boyd | 340/172.5 |
| 3,753,113 | 8/1973 | Maruta et al. | 340/347 DD |
| 3,761,888 | 9/1973 | Flynn | 340/172.5 |
| 3,781,856 | 12/1973 | Alzawa et al. | 364/200 |
| 3,810,154 | 5/1974 | Briant | 340/347 DD |
| 3,829,779 | 8/1974 | Fujimoto | 340/347 DD X |
| 3,831,168 | 8/1974 | Gronner et al. | 340/347 AD |
| 3,842,414 | 10/1974 | Chen et al. | 340/347 DD |
| 3,930,232 | 12/1975 | Wallach et al. | 340/347 DD X |

*Primary Examiner*—Mark E. Nusbaum
*Attorney, Agent, or Firm*—R. S. Sciascia; Charles D. B. Curry

[57] ABSTRACT

A data processing system for receiving sampled analog data and automatically converting, processing, compacting, expanding and storing the data in digital format and also displaying the data in alphanumeric format. The analog data signal may be from a temperature probe, for example, that is launched from a ship and transmits sampled temperature data as it free-falls in the ocean. The system has the capability of providing all of the general information, data and control signals, all in proper digital format, for permanent storage or for operating a teletype machine in total run real time to provide a real time output chart. The system includes compaction and expansion capabilities so that data that is being sampled at a rate that is faster than the readout rate of the teletype machine may be internally compacted and then expanded into the teletype machine when the data sampling rate is slower than the readout rate of the teletype machine. For radio teletype transmission communication a punched paper tape may be provided to eliminate the need for the teletype operator to cut the message. The system also provides a technique for converting one binary format into another binary format.

6 Claims, 13 Drawing Figures

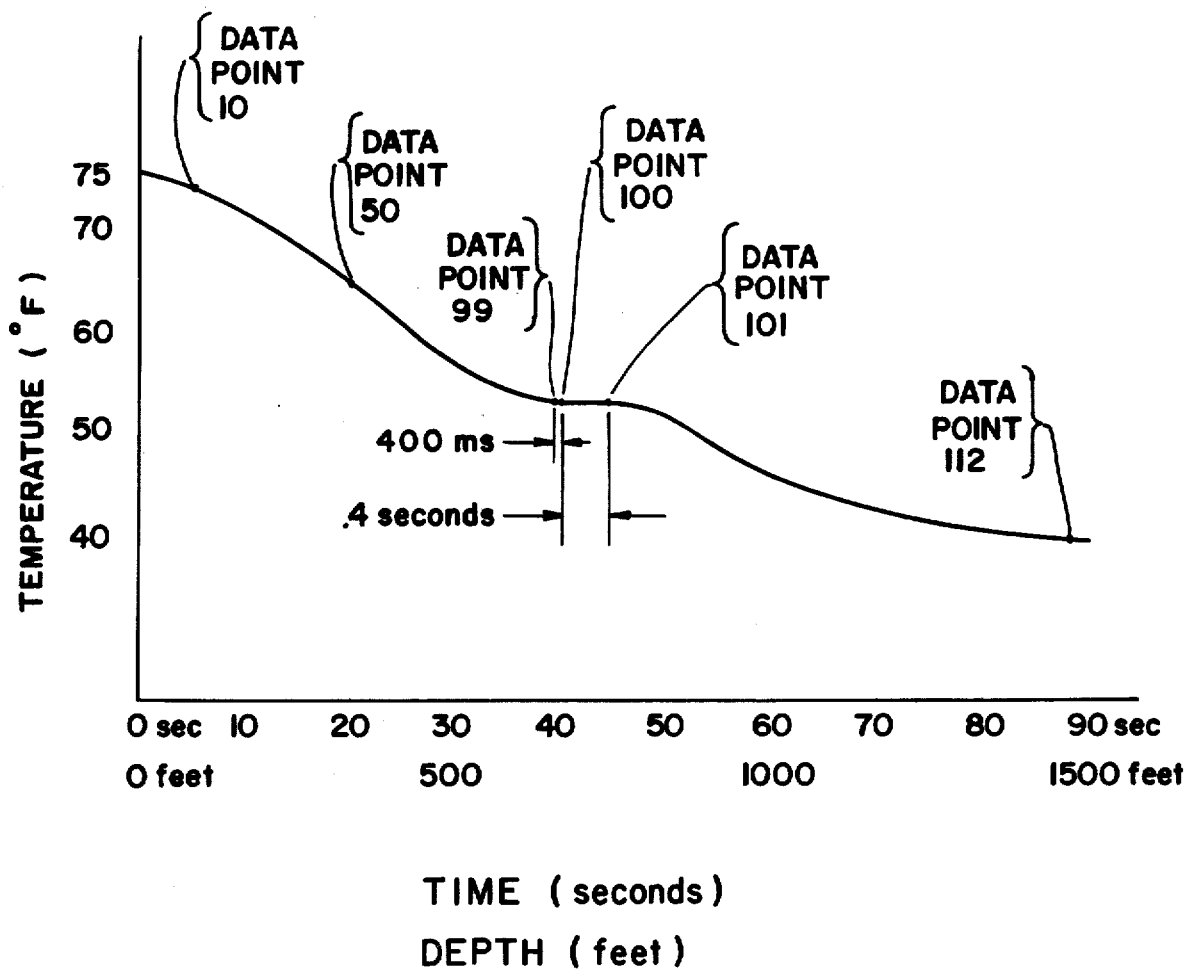
FIG_1

|  | SHIP CODE | DAY | MONTH | YEAR | 24 HOUR TIME | OCEAN QUADRANT | LATITUDE | LONGITUDE | TYPE OF DATA | TYPE OF INST | CALIBRATION TEMPERATURE |
|---|---|---|---|---|---|---|---|---|---|---|---|
| ID | FNWC | 1 | 80 | 77 | 51444 | 7 | 3540 | 12152 | 9 | 4 | 168 |

```
750;749 749 748 747 746 745 744 742 740   ← DATA POINT 10
739;737 736 734 733 732 731 729 727 725
722;719 716 713 710 707 704 701 698 695
692;690 687 684 682 679 677 674 672 670
667;664 662 659 657 654 652 649 647 645
641;638 634 630 626 623 620 616 613 610     DATA POINTS
606;602 597 592 588 584 580 576 573 570
567;564 561 559 557 555 553 552 551 550
549;548 547 546 545 544 543 542 541 540
540;539 539 538 538 537 537 536 536 535
535/533 504 480 455 450 435 425 420 415    ← DATA POINT 100
410/400   ← DATA POINT 112
```

;- START NEW LINE OF 10 DATA POINTS AT 400 ms INTERVALS
/- START NEW LINE OF 10 DATA POINTS AT 4 SECOND INTERVALS

FIG_2

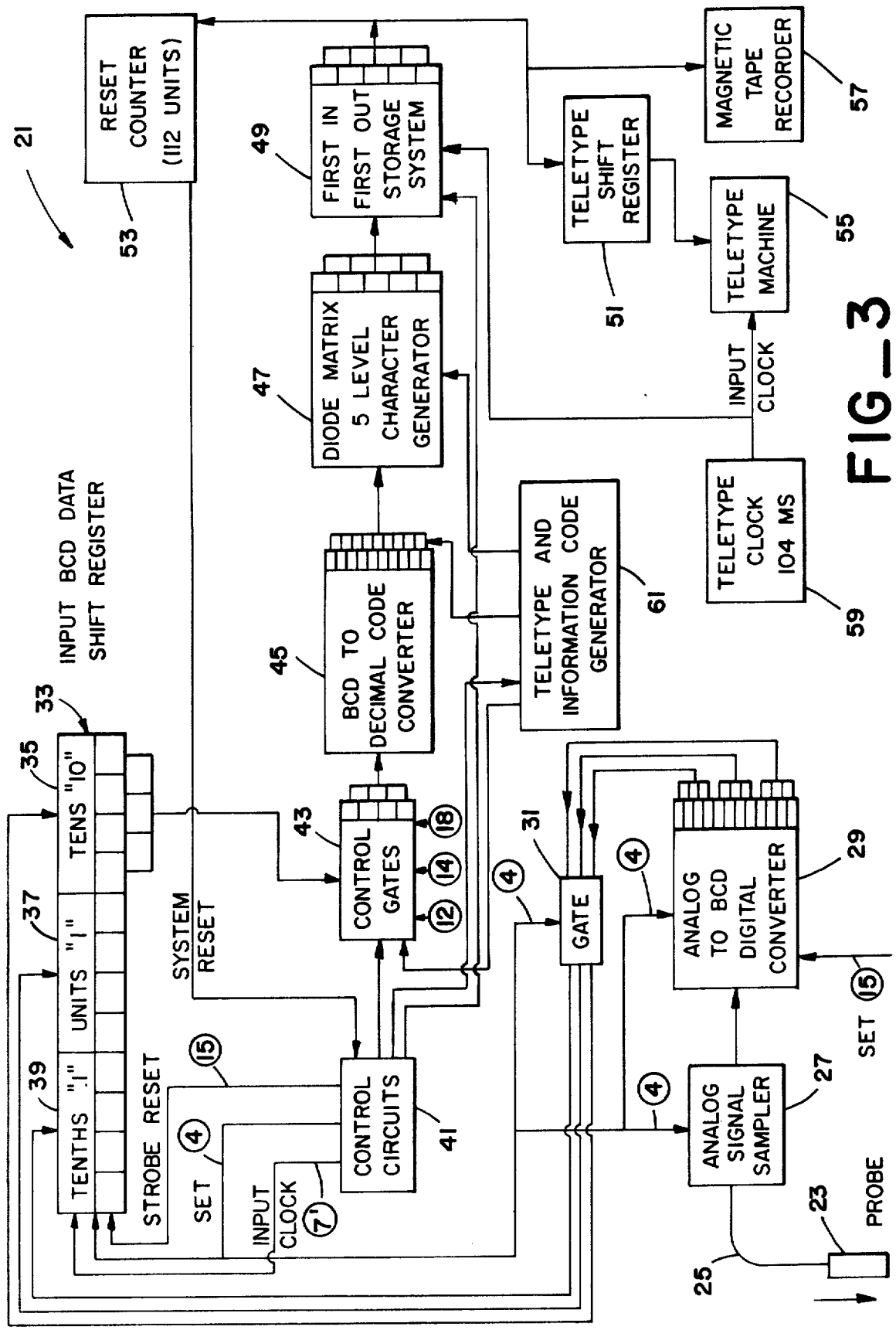

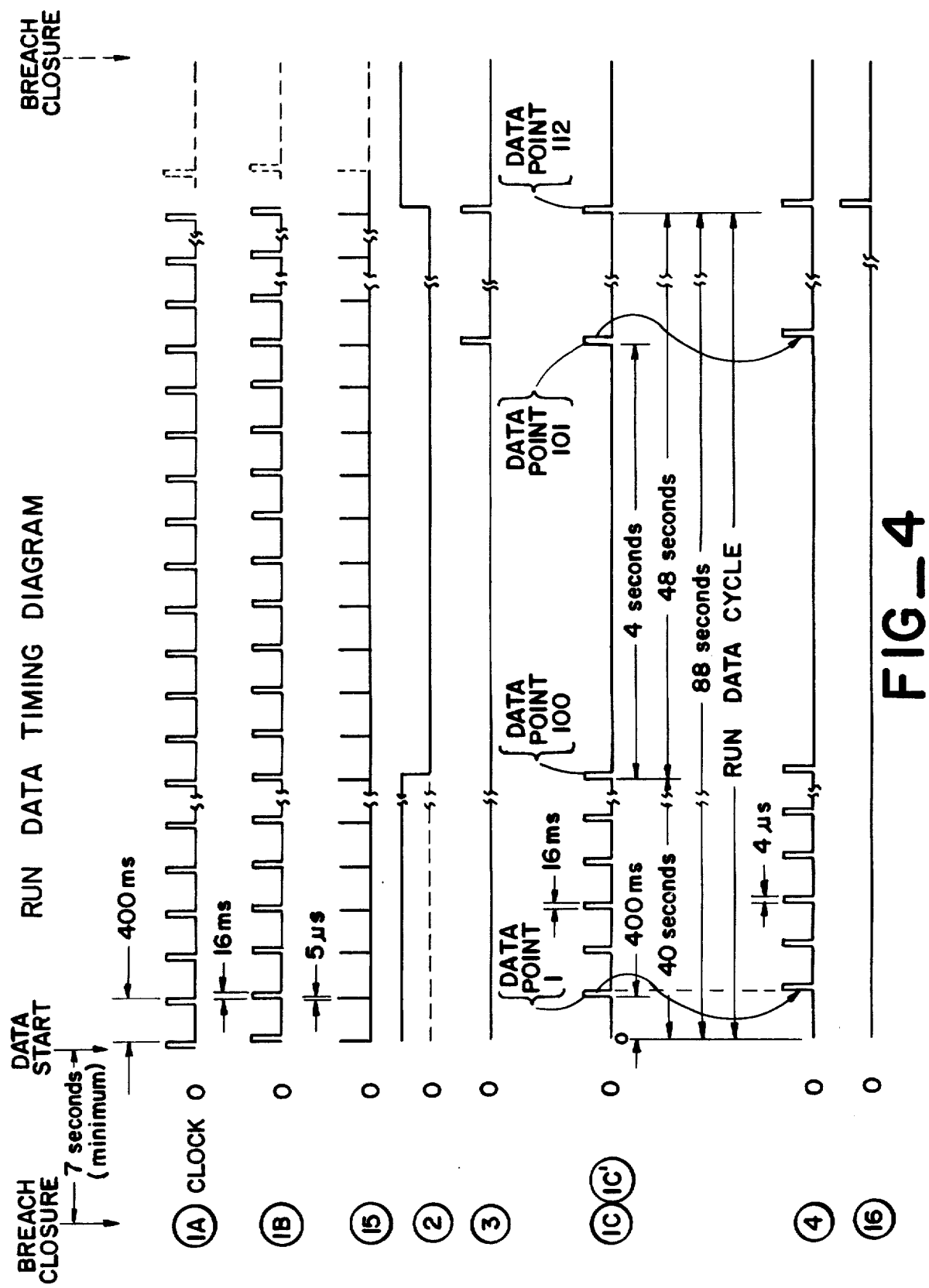
FIG_4

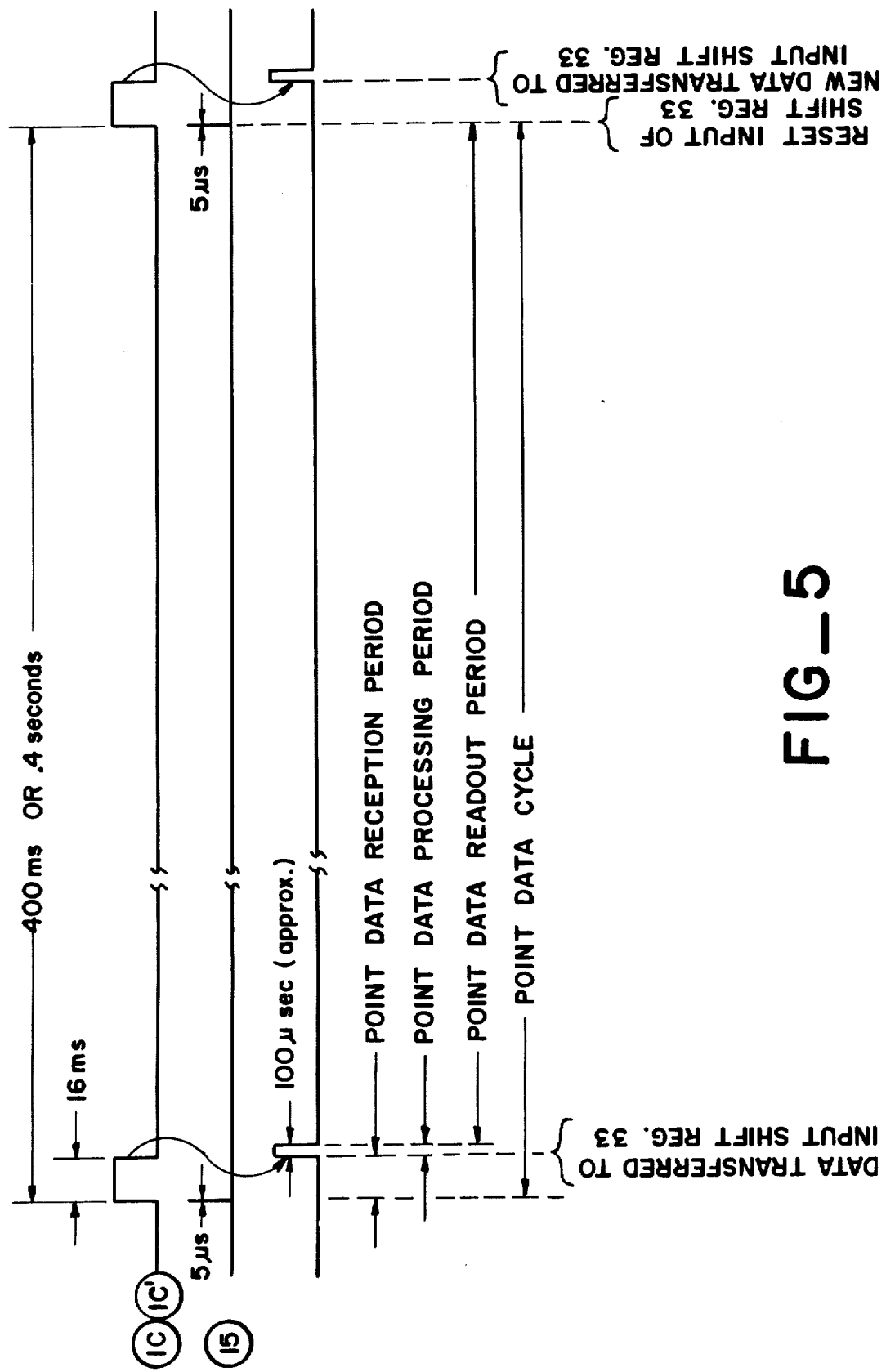
FIG_5

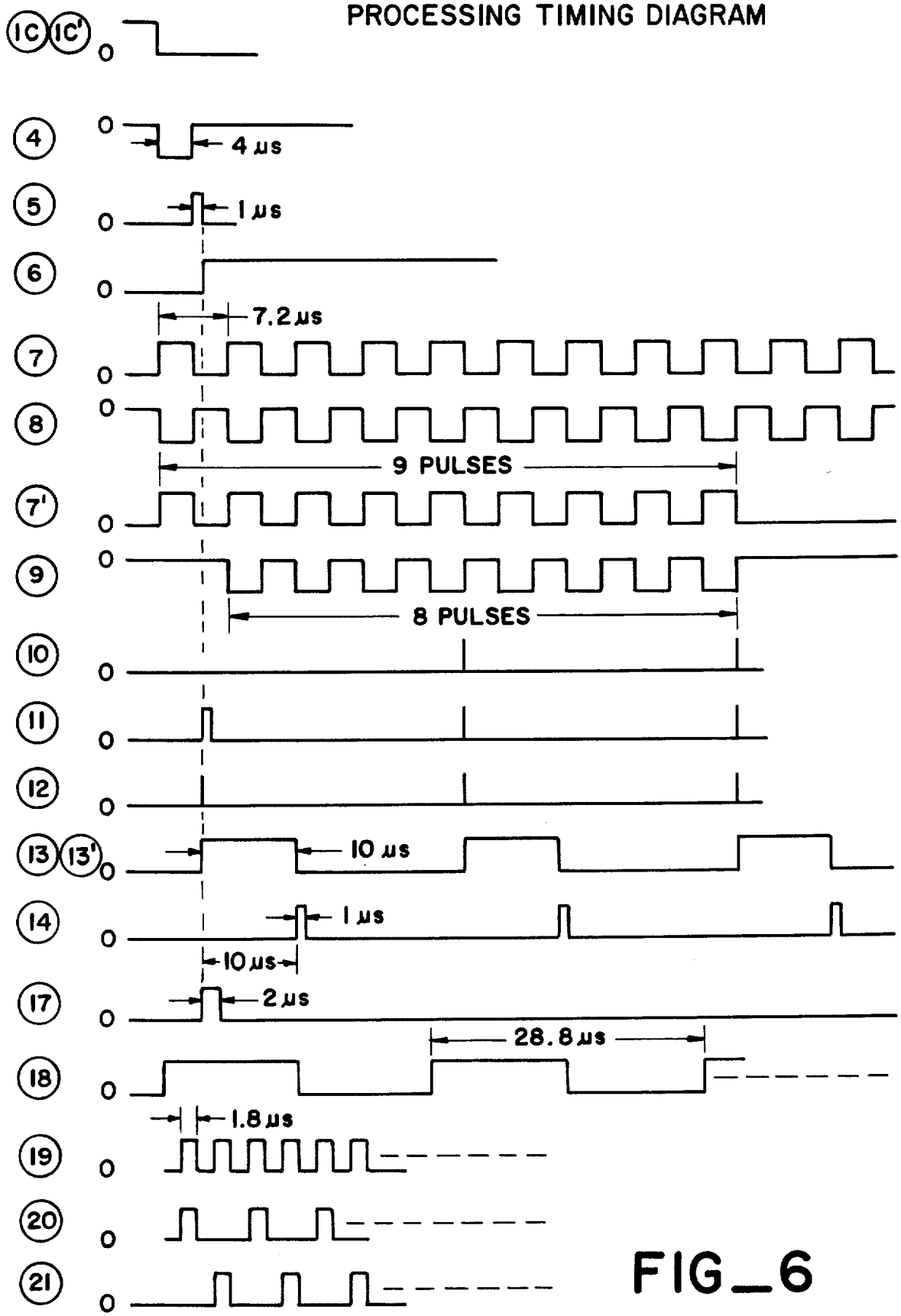

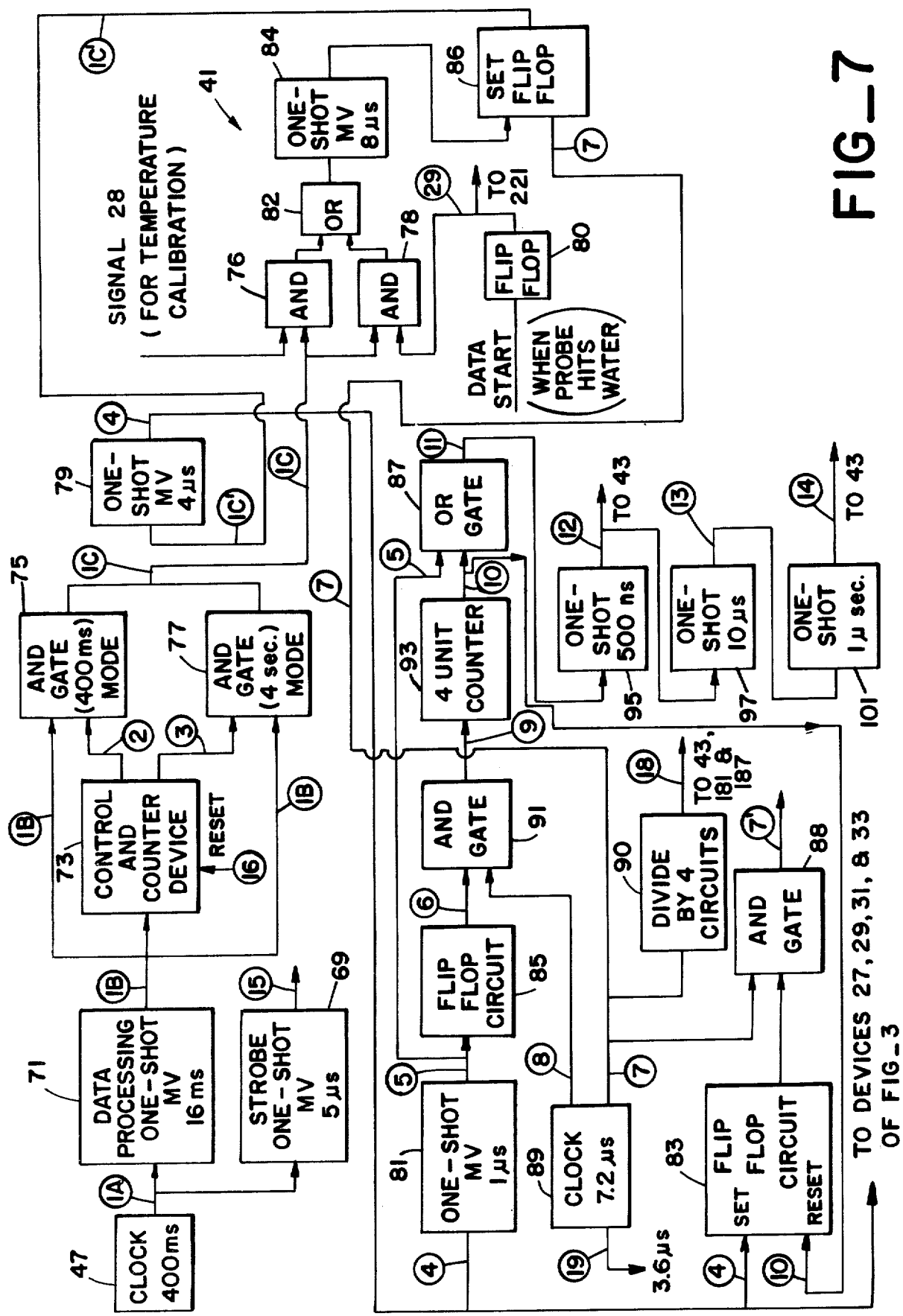
FIG_7

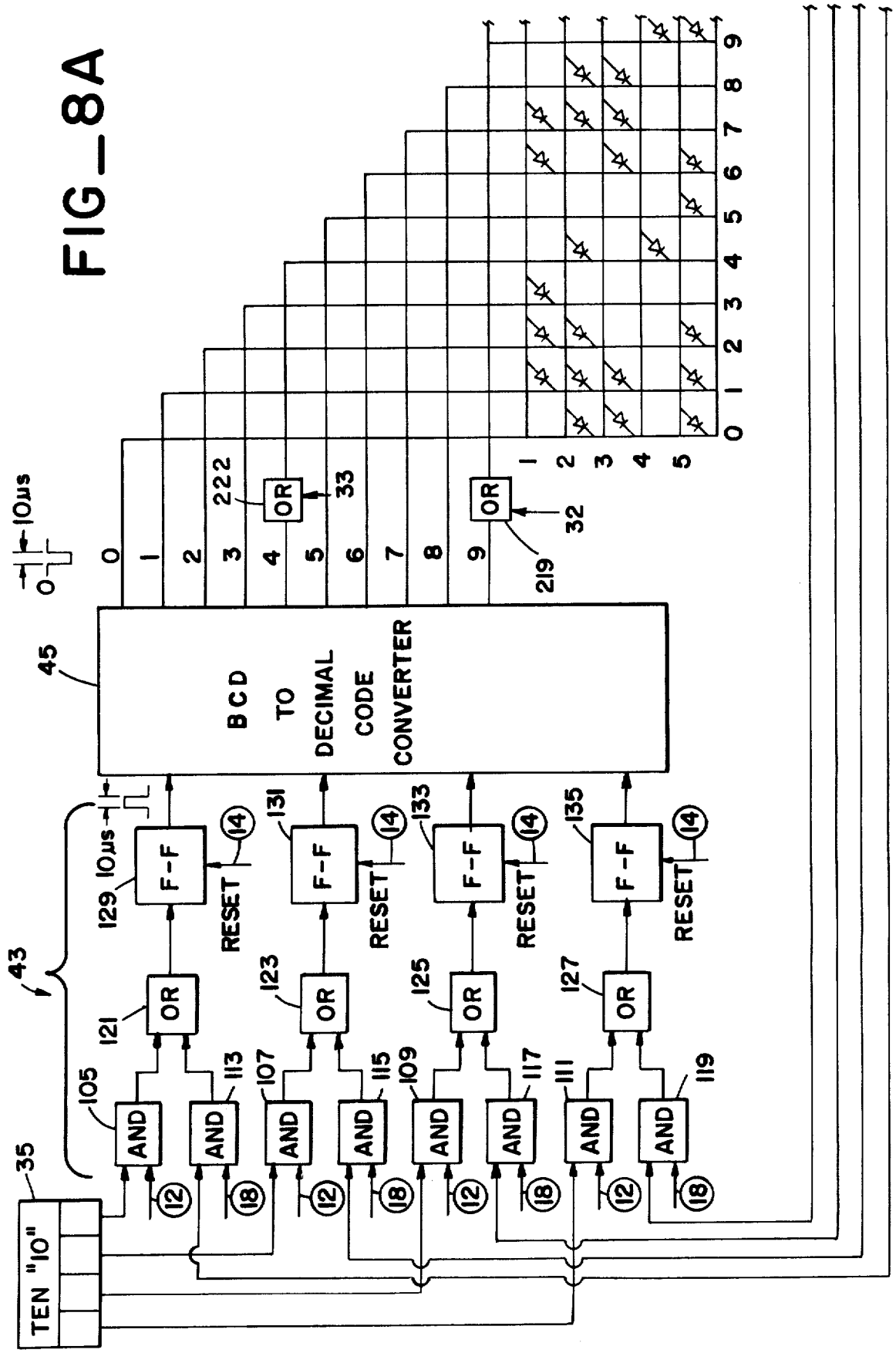
FIG_8A

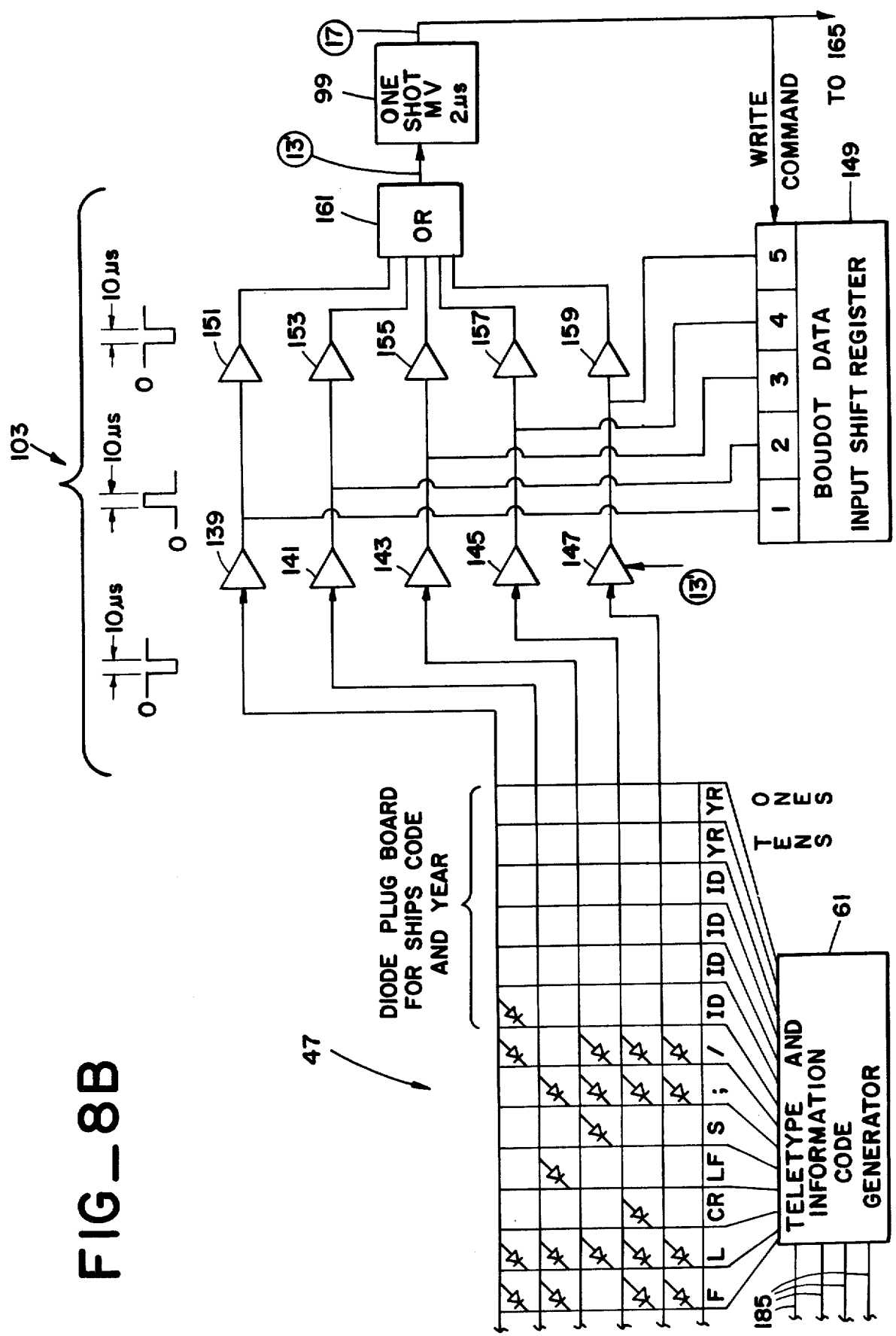

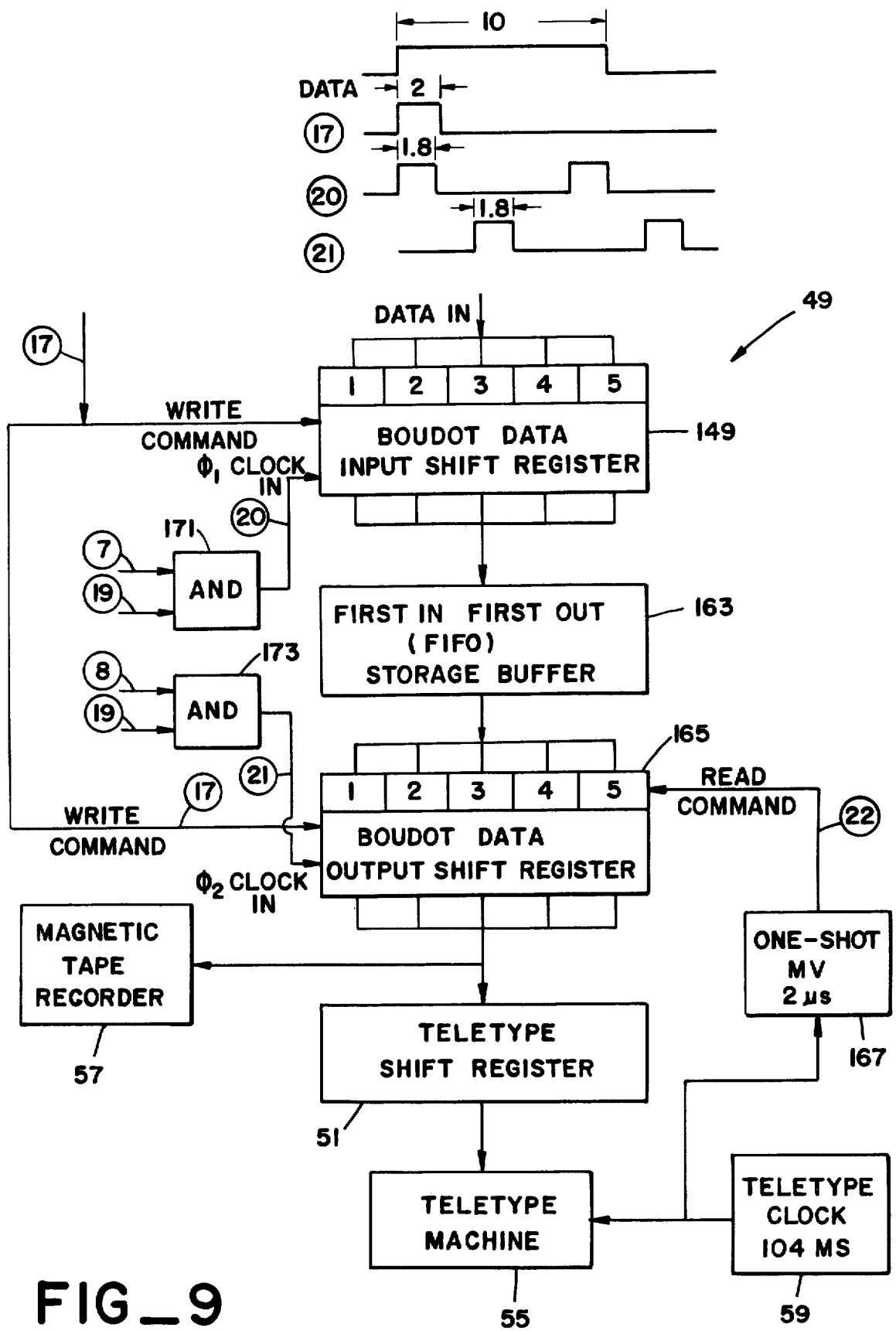
FIG_9

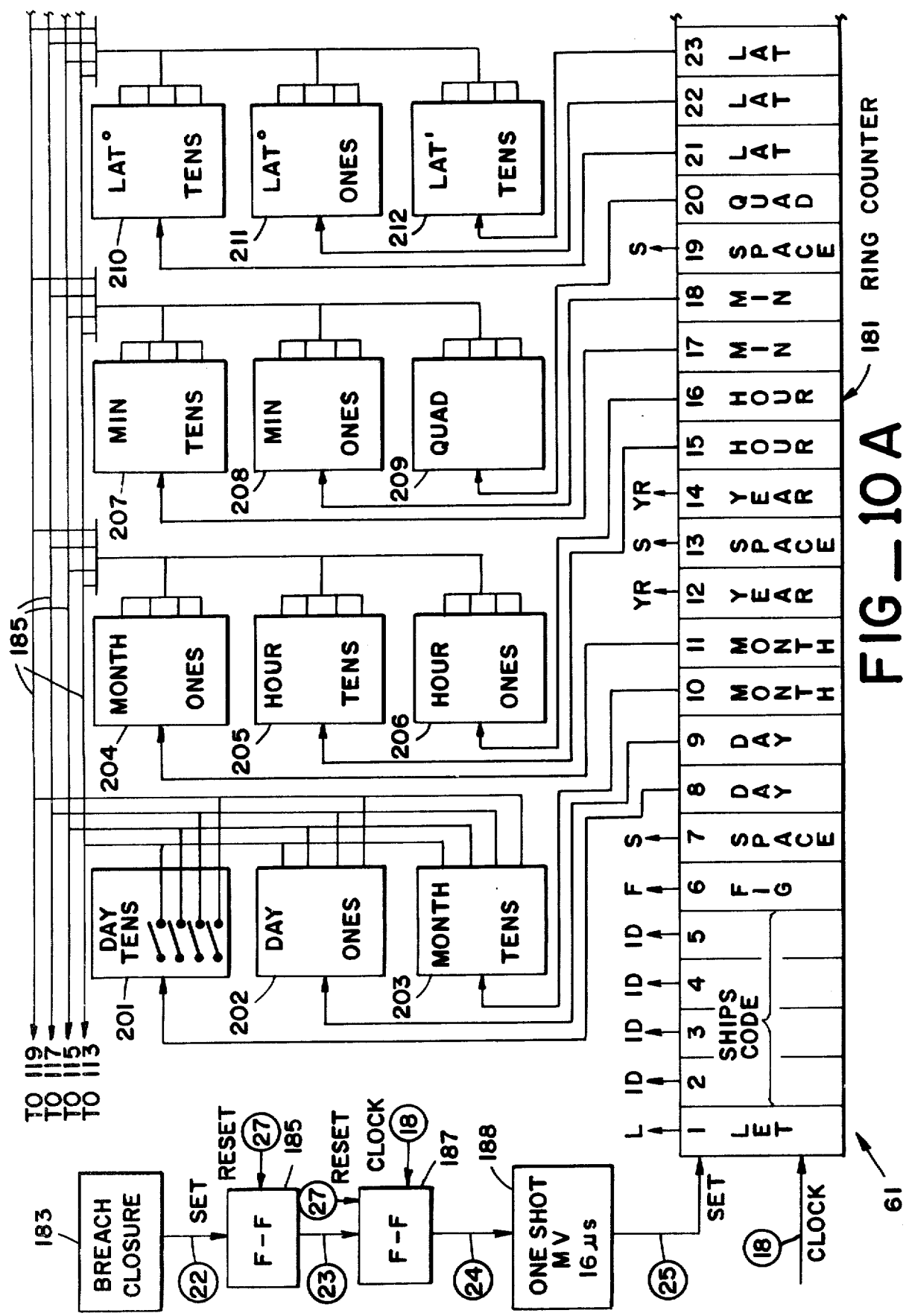
FIG_10A

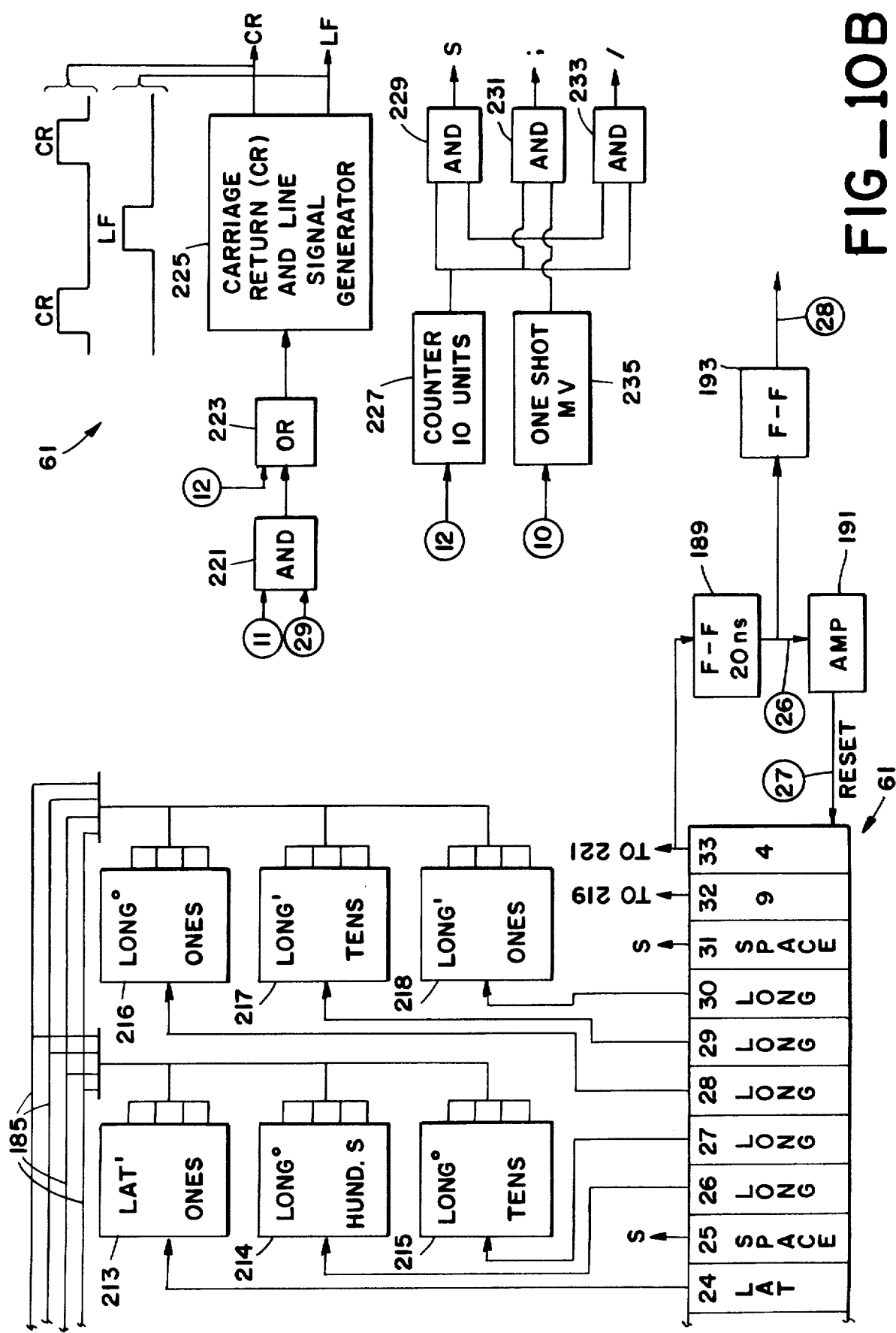

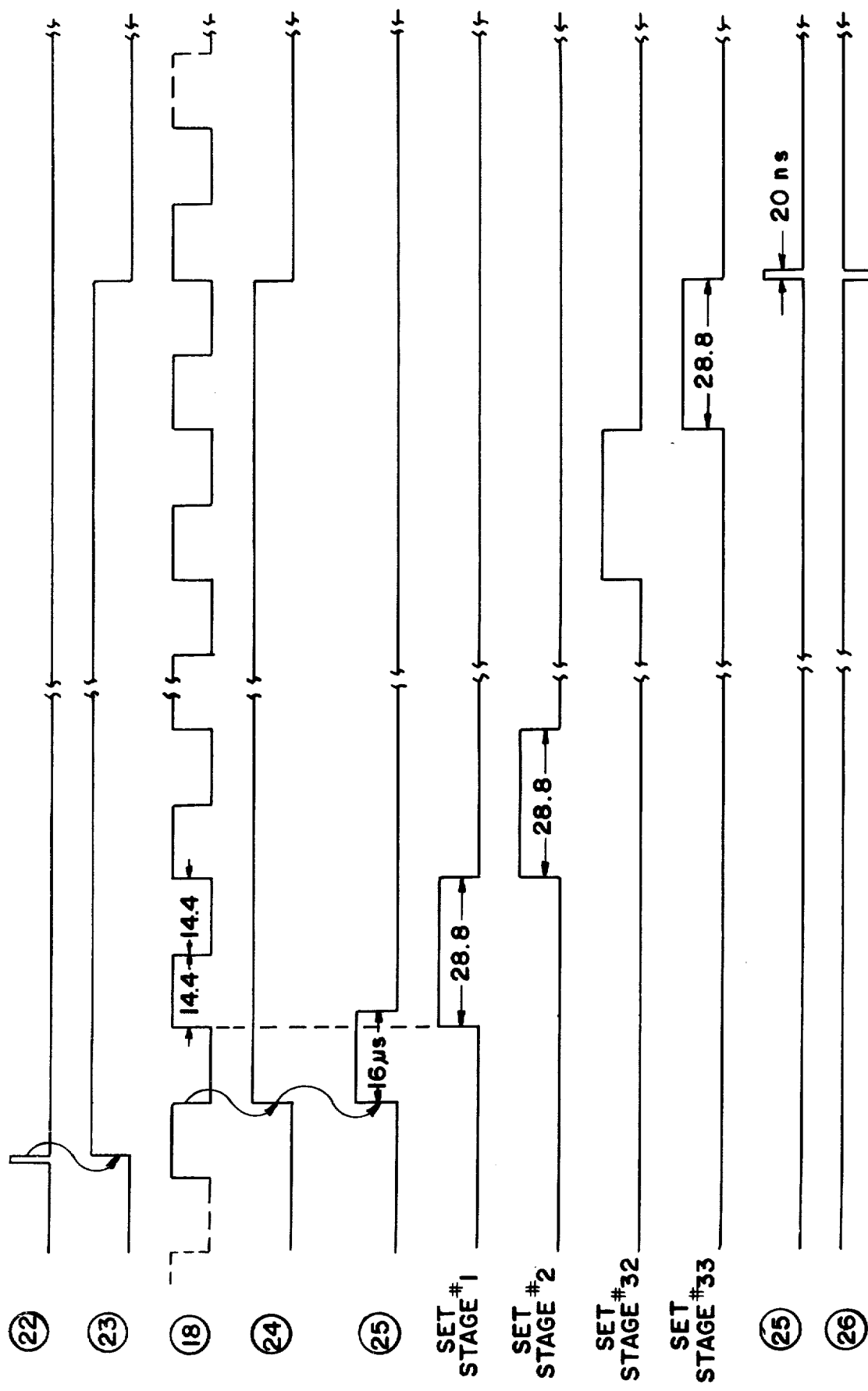

DATA PROCESSING SYSTEM

BACKGROUND OF THE INVENTION

1. Field of the Invention

The present invention relates to a data processing system and more particularly to a data processing system that is suitable for use with teletype operations.

2. Description of the Prior Art

There is a growing need for the systematic investigation and mapping of the various physical characteristics of the oceans of the world. There are many groups from many countries that are actively conducting extensive research programs to achieve this ocean mapping objective. One of the principal areas of investigation is the mapping of the temperature profile of these oceans during all seasons and over a period of years. This is a huge undertaking that requires many millions of temperature profile samples. Until the advent of the computer and digital processing equipment it was virtually impossible to process all of the sampled information into a meaningful presentation.

A typical technique used today in obtaining the ocean temperature profile is to launch a temperature probe from a moving ship. The probe is selected to have a predetermined falling rate and transmits an analog voltage on a thin wire that is connected between the probe and the ship. The wire unravels from a spool mounted on the probe as it free-falls in the water. The probes are relatively inexpensive and are disposable. When the probe reaches a predetermined depth all of the wire has been spent and then breaks which is the completion of the sampling of the water temperature. Normally, when near the surface the sampling rate is rapid and then slower at greater depths. A typical probe drop generally involves more than a hundred temperature sample points. During a voyage a single ship may make several hundred probe drops to achieve its ocean temperature mapping mission.

The prior method of recording the temperature data points for each probe drop was to record the information on a strip chart recorder. Upon the completion of the ship's voyage all of the strip charts were mailed to the data center where they were digitalized by hand and entered onto magnetic tape for computer entry. The disadvantages of this technique were poor accuracy achieved by visual readoff of the strip chart, the great number of man-hours required to process the strip charts and, perhaps most important, the huge back log of strip charts that were awaiting to be processed.

The present invention overcomes these problems since it directly and immediately processes for entry on board the ship all of the sampled information onto the magnetic tape in proper digital format. It also provides for real time teletype readout. In addition, it presents information suitable for punching onto paper to provide for radio teletype transmission communication. In addition to the foregoing, it should be noted that one of the common digital formats used in the data processing field is referred to as the Binary Coded Decimal (BCD) format. This is frequently used to present analog information, such as that sampled from a temperature probe, in a digital format. Another common binary format is referred to as the Baudot Code. This is extensively used in the teletype field. One of the purposes of the present invention is to provide an effective technique for converting one binary format, such as the BCD format, into another format, such as the Baudot Code.

SUMMARY OF THE INVENTION

Briefly, the present invention comprises a data processing system for receiving sampled analog data and automatically converting, processing, compacting, expanding and storing the data in digital format and also displaying the data in alphanumeric format. The analog data signal may be from a temperature probe, for example, that is launched from a ship and transmits sampled temperature data as it free-falls in the ocean. The system has the capability of providing all of the general information, data and control signals, all in proper digital format, for permanent storage or for operating a teletype machine in total run real time to provide a real time output chart. The system includes compacting and expansion capabilities so that data that is being sampled at a rate that is faster than the readout rate of the teletype machine may be internally compacted and then expanded into the teletype machine when the data sampling rate is slower than the readout rate of the teletype machine. For radio teletype transmission communication a punched paper tape may be provided to eliminate the need for the teletype operator to cut the message. The system also provides a technique for converting one binary code into another binary code.

This is achieved by the use of an analog sampler that samples the continuous probe output at predetermined time intervals. Each sampled analog signal is converted to a 12-bit binary coded decimal (BCD) format, for example, by an analog to BCD digital converter. The output of the converter is gated into an input BCD data shift register. The output of the shift register is transmitted through control gates to a BCD to decimal code converter. The output of the BCD to decimal code converter is transmitted to a diode matrix 5 level digital format character generator. The output of the 5 level character generator is transmitted to a first-in first-out storage system the output of which is applied to a teletype shift register. The output of the shift register may be applied to a magnetic tape recorder and/or a teletype machine for real time display. The system includes a teletype and information code generator and a control system to control the automatic operation of the system.

STATEMENT OF THE OBJECTS OF THE INVENTION

An object of the present invention is to provide a data processing system.

Another object of the present invention is to provide a data processing system that converts sampled analog input information into its proper digital format.

Still another object of the present invention is to provide a data processing system that automatically converts the sampled analog information into a digital format suitable for magnetic storage and for operation of a teletype machine.

A further object of the present invention is to provide a data processing system that receives sampled analog data and automatically converts, processes, compacts, and expands the data in a digital format.

A still further object of the present invention is to provide a data processing system that is potentially useful for sampling the analog data from a temperature probe.

A still further object of the present invention is to provide for radio teletype transmission communcation by providing a digital format suitable for use with a punched paper tape.

A still further object of the present invention is to provide a technique for converting one binary format into another binary format.

A still further object of the present invention is to provide a data processing system having the capability of providing all of the general information, data and control signals, all in proper digital format, for permanent storage and for operating a teletype machine in total run real time to provide a real time output chart of the sampled analog input.

A still further object of the present invention is to provide a data processing system that is portable, light weight, inexpensive, easy to operate, and reliable.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a curve or run that illustrates a typical ocean temperature profile as a function of depth;

FIG. 2 is a typical output chart that is printed by a teletype machine having the required information about the temperature run shown in FIG. 1;

FIG. 3 is a block diagram showing the overall information or data processing system of the present invention;

FIG. 4 is a run data timing diagram illustrating the operation of the system shown in FIG. 3;

FIG. 5 is a point data timing diagram illustrating the operation of the system shown in FIG. 3;

FIG. 6 is a point data reception and processing timing diagram illustrating the operation of the system shown in FIG. 3;

FIG. 7 is a block diagram illustrating the details of the control circuits of the data processing system of FIG. 3;

FIGS. 8A and 8B are block and schematic diagrams illustrating the details of the control gates and diode matrix 5 level character generator of the data processing system of FIG. 3;

FIG. 9 is a block diagram illustrating the details of the first-in first-out storage system of the data processing system of FIG. 3;

FIGS. 10A and 10B are block diagrams illustrating the details of the teletype and information code generator of the data processing system of FIG. 3; and FIG. 11 is a timing diagram illustrating the operation of the teletype and information code generator of FIG. 10.

DESCRIPTION OF THE PREFERRED EMBODIMENT

In FIG. 1 is illustrated a curve showing the ocean temperature characteristics as a function of depth. In the example shown in FIG. 1 the depth is also equivalent to time. This is because the ocean temperature is frequently measured by a free falling temperature probe. The probe may be selected to having a falling rate of about 17 feet per second, for example, and may be launched from a moving ship wherein the temperature sensor transmits an analog voltage on a thin wire that is connected between the probe and the ship. The wire unravels from a spool mounted on the probe as the probe free-falls in the water. When the probe reaches a depth of 1500 feet, for example, all of the wire has been spent and then breaks which is the completion of sampling of the water temperature. Normally, 100 sample or data points are taken at 400 millisecond (ms) intervals (where the temperature changes are generally more rapid and more critical) and then 12 sample or data points are taken at 4 second intervals to complete the run.

In FIG. 2 is shown a typical output chart that is printed by a teletype machine having the required information about the temperature run shown in FIG. 1. The information processing system of the present invention, shown in FIGS. 3 through 11, provides all of the general information, data and control signals, all in proper digital format, for operating the teletype machine to provide an output chart, such as that shown in FIG. 2, for each temperature probe run.

The first line of the output chart contains identification information (ID) of the run as indicated by the associated legends. The next ten lines contain 100 data points sampled at 400 ms time intervals. The last two lines contain 12 data points sampled at 4 second time intervals. It should be noted that a teletype machine is operated by a five level binary "baudot" code and at a single character rate of about 104 ms. Referring to FIG. 2, the temperature 73.1° F. (line 3, data point 17) is represented by the five level binary "baudot" code of 5(00001), 3(10000), 1(11101) and the space (00100). Each element of the "baudot" code representing the 5, 3, 1 and space require 104 ms for processing by the teletype machine and therefore a total teletype processing time of 416 ms per data point is required. From this it can be seen that the 400 ms sample rate of the probe is less than the processing time of the teletype and therefore a real time transfer of the sampled probe temperature (converted to the proper processing codes) cannot be achieved. It should be also noted that at the end of the first line of data points of FIG. 2 that the teletype machine must make two carriage returns and a line feed. This requires an additional 312 ms. Therefore, a real time transfer between the probe sample rate and the teletype machine is further inhibited. From this it can be seen that the real time transfer between the temperature probe and the teletype machine is not possible during the first one hundred sampled points. That is, the sample time is about 40 seconds (100×400 ms=40 seconds) and the teletype processing time is about 44.6 seconds [(10×416 ms+300 ms)10=44.6 seconds]. One of the objects of the present invention is to provide a completely electronic total run (all 112 data points) real time transfer between the probe and the teletype machine. Another object of the present invention is to convert a typical 12 bit BCD word representing the analog voltage of a data point (which is performed by a standard digitizer) to the 5 level "baudot" code. Still another object is to provide an electronic system that effectively and reliably provides identification codes and teletype control codes.

In FIG. 3 is illustrated a block diagram showing the information processing system 21 of the present invention. In the example shown and previously described with respect to FIGS. 1 and 2 the temperature of the ocean, for example, is measured by a conventional temperature probe 23 which provides a continuous analog voltage output on wire 25 that represents the temperature of the ocean. The continuous analog voltage on wire 25 is sampled by a conventional analog signal sampler 27 which typically samples ocean temperatures at the previously described rates. The sampled analog output of analog signal sampler 27 is applied to the input of a conventional analog to BCD (Binary Coded Decimal) digital converter 29. The output of analog to BCD digital converter 29 is a 12 bit word wherein 3 groups of 4 bits each represent the sampled temperature in tens "10", units "1", and tenths "0.1". It is to be understood that a greater or lesser number of groups may be employed to provide a greater or lesser number of places in the number and that codes other than 4 bit BCD may be employed to represent the sampled analog signal. However, the invention is being described for use with a 12 bit BCD code since that is the code frequently used with this type of sampling system. It will be obvious to one skilled in the art of digital information processing systems that the system of the present invention may be modified to accommodate other types of input signals, sample rates and digital formats. Such modifications are considered to be within the scope of the present invention provided these modifications are compatible with the hereinafter described teachings of the present invention.

The output of analog to BCD digital converter 29 is shown as a 12 wire or bit output (which is reduced to 3 wires for ease of illustration). The three wires (each wire containing one of three groups of 4 bits each) are connected through gate 31 to the input of input BCD data shift register 33. Shift register 33 is of the parallel in series out type and is shown as having a 12 bit capacity comprising a 4 bit tens "10" section 35, a 4 bit units "1" section 37 and a 4 bit tenths "0.1" section 39.

The control of information processing system 21 is achieved by control circuits 41, the timing diagrams of which are shown in FIGS. 4, 5 and 6 and the logic circuits of which are principally shown in FIG. 7. A set or control signal 4, which is generated by control circuits 41, is applied to the gating input of gate 31 and to the control inputs of analog signal sampler 27 and analog to BCD digital converter 29. As previously explained the desired sampling rate is 400 ms and then 4 seconds and therefore the gating rate of signal 4 is also selected to be 400 ms and then 4 seconds. It is to be understood that analog signal sampler 27, analog to BCD digital converter 29 and gate 31 may be combined into a single sampling and readout system that provides a BCD gated output at 400 ms and then 4 second intervals to shift register 33.

The gated output of gate 31 is applied in parallel to the data inputs of sections 35, 37 and 39 of shift register 33. The output of 4 bit tens "10" section 35 is applied in parallel to the input of control gates 43. The 4 bit output of control gates 43, the details of which are shown in FIG. 8A, is applied in parallel to the input of a conventional BCD to decimal code converter 45 the outputs of which are individually and selectively applied to the inputs of diode matrix 5 level character generator 47, the details of which are shown in FIGS. 8A and 8B. Character generator 47 generates a 5 level or bit code, such as the "baudot" code, which is suitable for operating a teletype machine, for example. The output of character generator 47 is applied in parallel to the input of first in first out storage system 49, the details of which are shown in FIG. 9. The output of storage system 49 is applied in parallel to the input of a conventional teletype shift register 51, which is of the parallel in series out type, to the input of magnetic tape recorder 57, and to the input of reset counter (112 units) 53. The output of teletype shift register 51 is applied to the input of teletype machine 55 and to any other type of receiving or interface equipment. A teletype clock 59, having a 104 ms period, is applied to the inputs of storage system 49 and teletype machine 55 to control their operation at the selected 104 ms rate of operation. The output of reset counter 53 is applied to the reset input of control circuit 41 to reset the system for a new data run.

Teletype and information code generator 61 is provided to automatically generate both teletype code control signals and information code signals. The specific details of teletype and information generator 61 will be hereinafter described with respect to FIGS. 10 and 11. One output of generator 61 is applied to the input of BCD to decimal code converter 45 to provide certain non-data type information, such as BCD date-time information. Another output of generator 61 is applied to the input of character generator 47 to provide other types of non-data type information and proper signals for controlling the teletype machine 55.

The specific details of the various circuits and the operation of the information processing system 21 of FIG. 3 will be hereinafter described with respect to FIGS. 4, 5, 6, 7, 8, 9, 10 and 11.

In FIGS. 4, 5 and 6 are illustrated the timing diagrams for the information processing system 21 of FIG. 3 and the control system 41 of FIG. 7. Referring generally to FIG. 3 and specifically to FIG. 7 control system 41 includes a clock 47, having a 400 ms period, the output signal 1A (see also FIG. 4) of which is connected to the input of strobe one-shot multivibrator 69 and data processing one-shot multivibrator 71. The time duration of the pulse from strobe multivibrator 69 is selected to be 5 μs (microseconds) as illustrated by curve 15 of FIGS. 4 and 5 and the time duration of the pulse from data processing multivibrator 71 is selected to be 16 ms (milliseconds) as illustrated by curve 1B of FIG. 4. Signal 15 from strobe multivibrator 69 is applied to the strobe reset input of input BCD data shift register 33 for resetting shaft register 33 after each data point has been processed and to the set input of analog to BCD digital converter 29 to read the new output of analog signal sampler 27. The output signal 1B of data processing one-shot multivibrator 71 is simultaneously applied to the inputs of control and counter device 73, AND gate (400 ms mode) 75 and AND gate (4 second mode) 77. The function of control and counter device 73, the details of which are not shown, is to provide signals 2 and 3 as shown in FIG. 4. Signal 2 is continuous during the first 100 data or sample points and is applied to one input of AND gate (400 ms mode) 75. Signal 3 is a group of 12 pulses that occur during the 101 through 112 data points and are coincident with the signal 1B pulses and are applied to one input of AND gate (4 second mode) 77. The details of control and counter device 73 are not shown since its construction would be obvious to one skilled in the art knowing its above described functions.

With the above described timing and control of AND gates 75 and 77 the combined output of these two gates will result in signal 1C of FIG. 4 which, for a run data cycle of 88 seconds and 112 sample points, results in 112 pulses of 16 ms time duration each. The first 100 pulses are at 400 ms intervals and the last 12 pulses are at 4 second intervals. The outputs of AND gates 75 and 77 are applied to the inputs of AND gates 76 and 78. The other input to AND gate 76 is signal 28 from ring counter 181 shown in FIG. 10. Signal 28 occurs when the breach of the probe launcher, not shown, is closed and functions to provide a calibration temperature point as hereinafter explained. The other input to AND gate 78 is obtained from flip-flop 80 which provides a continuous output signal, from a water responsive switch, for example, when the temperature probe 23 hits the water. This is the start of the data collection cycle. The outputs of AND gates 76 and 78 are applied to the inputs of OR gate 82 the output of which is connected to the input of one-shot multivibrator 84 having a time duration of 8 $\mu$s. The output of one-shot multivibrator 84 is applied to the set input of flip-flop 86 and a clock input signal 7 from clock 89 is applied to the clock input of flip-flop 86. One-shot multivibrator 84 and flip-flop 86 together cause the negative going trailing edge of signal 1C to coincide with the leading edge of signal 7 and thereby synchronize the two clock signals 7 and 8 with the data signals. The output of flip-flop 86 is shown as signal 1C'. From FIG. 7 it can be seen that signals 1C and 1C' are different signals; however, since they occur at the same time they are shown as the same signals in the timing diagrams of FIGS. 4, 5 and 6.

One-shot multivibrator 79 provides an output signal 4, which is coincident with signal 1C' and is initiated by the trailing edge of each of the 1C' signal pulses. Signal 4 is applied to the inputs of one-shot multivibrator 81 having a pulse duration of 2 $\mu$s, flip-flop circuit 83 of FIG. 7 and sampler 27, converter 29, gate 31 and shift register 33 of FIG. 3. Referring to FIGS. 6 and 7, the output signal 5 of one-shot multivibrator 81 is applied to the input of flip-flop circuit 85 and to one input of OR gate 87. A clock 89 having a 7.2 s period provides output clock signals 7 and 8 that are made synchronous with the leading edge of signal 4 having a 4 $\mu$s time duration. Clock 89 is selected to have a 7.2 $\mu$s time period since this makes it possible to convert a 9 pulse signal to an 8 pulse signal so that an even unit counter 93 may be used to provide proper control signals. Signal 4 is applied to the set input of flip-flop 83 and signal 10 from counter 93 is applied to the reset input. The output of flip-flop 83 is applied to one input of AND gate 88 and the clock signal 7 is applied to the other input of AND gate 88. From the timing diagram of FIG. 6 it can be seen that the output signal 7' of AND gate 88 will consist of 9 pulses and the output signal 9 of AND gate 91 during this same period well consist of 8 pulses as described below. A nine pulse signal 7' is needed to load the data, by the first pulse, and shift the loaded data in register 33, with the following 8 pulses. The 8 pulse signal 9 is needed to generate the two pulses in signal 10.

Signal 8 of clock 89 is applied to one input of AND gate 91 and signal 6 is applied to the other input of AND gate 91. From the timing diagram of FIG. 6 it can be seen that the output signal 9 from AND gate 91 is an 8 pulse signal which is applied to the input of 4 unit counter 93. The output signal 10 of 4 unit counter 93 is applied to the other input of OR gate 87 and, together with signal 5, provide a combined output signal 11. Output signal 11 is applied to the input of one-shot multivibrator 95 having a 500 ns (nanosecond) period which provides signal 12 as shown in FIG. 6. Output signal 12 of multivibrator 95 is applied to the input of 10 $\mu$s one-shot multivibrator 97 the output signal 13 of which is applied to the input of trailing edge responsive 1 $\mu$s one-shot multivibrator 101 which provides an output signal 14 as shown in the timing diagram of FIG. 6. It should be noted that signal 13 and therefore signal 14 is present only when data is present.

As previously explained, FIG. 4 is a complete run data timing diagram and in FIG. 5 is a point data timing diagram. From FIG. 4 it can be seen that a run comprises 112 points (100 at 400 ms and 12 at 4 seconds) and takes place over a time period of 88 seconds. The point data timing diagram of FIG. 5 represents the general timing diagram of a data point, the specific timing diagram being shown in FIG. 6. In a run there will be 112 points of data and the point data timing diagram of FIG. 5 will be repeated 112 times during the total data collection process or run. It should be noted that the point data cycle includes a point data reception period, a point data processing period and a point data readout period. During the initial 16 ms point data reception period (curve 1C of FIG. 5), point data is received and processed by probe 23, analog signal sampler 27, analog to BCD digital converter 29, gate 31 and is then stored in input BCD data shift register 33. The data stored in shift register 33 is then processed by the remaining parts of the information processing system 21 during the run which occurs during the next about 88 seconds. During the point data readout period, the point data is read out to the teletype machine 55 and magnetic tape recorder 57.

In FIGS. 8A and 8B are illustrated the details of the control gates 43, diode matrix 5 level character generator 47 and part of the control logic 103 for the first in first out storage system 49 of FIGS. 3 and 9.

The four bit positions of the 4 bit tens "10" section 35 of shift register 33 are applied in parallel to the inputs of AND gates 105, 107, 109 and 111, respectively. The other inputs of AND gates are connected to signal 12 which is the output signal from one-shot multivibrator 95 of control circuits 41 of FIG. 7. As hereinafter explained in detail four binary outputs of teletype and information code generator 61 are connected to the inputs of AND gates 113, 115, 117 and 119, respectively. The other inputs to AND gates 113, 115, 117 and 119 are connected to signal 18 from divide by 4 circuit 90 of control circuits 41 of FIG. 7. The function of signal 18 will be hereinafter explained with respect to the detailed description of generator 61 shown in FIGS. 10 and 11.

The outputs of AND gates 105 and 113 are connected to the inputs of OR gate 121, the outputs of AND gate 107 and 115 are connected to the inputs of OR gate 123, the outputs of AND gates 109 and 117 are connected to the inputs of OR gate 125 and the outputs of AND gates 111 and 119 are connected to the inputs of OR gate 127. The outputs of OR gates 121, 123, 125 and 127 are respectively applied to the inputs of flip-flop circuits 129, 131, 133 and 135. Applied to the reset input of each of flip-flop circuits 129, 131, 133 and 135 is reset signal 14 from one-shot multivibrator 101 of control circuits 41 of FIG. 7. The outputs of flip-flop circuits 129, 131, 133 and 135 are applied to the four BCD inputs of a conventional BCD to decimal code converter 45. The state of the flip-flops 129, 131, 133 and 135 define, by the BCD system, the temperature of the sensor at that particular point of sampled data. The BCD input is converted to its decimal equivalent by the BCD to decimal code converter 45. The 10 decimal positions are indicated at the ten outputs of converter 45 by the reference numerals 0, 1, 2, 3, 4, 5, 6, 7, 8 and 9. Each of these 0 through 9 outputs are respectively connected to the preselected diode sections of diode matrix 5 level character generator 47, as indicated by the reference numerals 0 through 9 at the bottom of character generator 47. Character generator 47 includes a plurality of input sections that are labeled from left to right at the bottom of the generator as being 0, 1, 2, 3, 4, 5, 6, 7, 8, 9, FIG, LET, CR, LF, SPACE, ;, /, SHIP ID, SHIP ID, SHIP ID, SHIP ID, YEAR 10's, YEAR 1's. The outputs of generator 47 comprise 5 lines labeled from top to bottom by reference numerals 1, 2, 3, 4 and 5. The generator includes a plurality of diodes 137 that are connected between the 5 input and output lines as indicated. The diodes are arranged to provide the proper "baudot" 5 level binary code output on output lines 1 through 5 in response to a particular input signal from converter 45. Output lines 1, 2, 3, 4 and 5 are respectively connected to the inputs of amplifiers 139, 141, 143, 145, and 147.

It should be noted that only one input signal at a time may be processed by generator 47 since the coded outputs on lines 1 through 5 are unique to each input. Therefore, operation of character generator 47 comprises the application of a series of discrete input signals of 10 μs time duration each, for example. Diodes 137 are arranged so that they are forward biased by the input signal applied to that particular diode. For example, when converter 45 provides a negative signal on the 0 input line (which represents 0), then the diodes 137 that are connected to output lines 2, 3 and 5 are forward biased (no diodes are connected to output lines 1 and 4) which results in a negative going signal being applied to the inputs of amplifiers 141, 143 and 147, which provide 10 μs pulses that represent the 5 level "baudot" binary code of 01101. In like manner, when a signal is received on input line 7 (which represents the decimal number 7) then the diodes 137 that are connected to output lines 1, 2 and 3 are forward biased which provide negative going signals to the inputs of amplifiers 139, 141 and 143 which provide 10 μs pulses at their outputs that represent the "baudot" code 11100. In like manner when an input signal from generator 61 is applied to the SPACE input, for example, then the diode 137 connected to output line 3 is forward biased which provides a negative going signal to the input of amplifier 143 and provides a signal that represents the "baudot" code 00100. The section of the diode matrix that provides the SHIP ID and the YEAR is preferably coded on a diode plug board so that the code may be reaily changed according to need. The selection of the particular code for various types of identification information and teletype control is achieved by teletype and information code generator 61 the details of which will be hereinafter explained with respect to FIGS. 10 and 11.

The outputs of amplifiers 139, 141, 143, 145 and 147 are respectively applied to the 1, 2, 3, 4 and 5 inputs of "baudot" data input shift register 149 and to the inputs of amplifiers 151, 153, 155, 157 and 159 which provide 10 μs negative going output pulses as shown in FIG. 8B. The outputs of amplifiers 151, 153, 155, 157 and 159 are applied to the inputs of OR gate 161. The output signal 13' of OR gate 161 is applied to the input of one-shot multivibrator 99 having a pulse width of 2 μs. From FIGS. 7 and 8B it can be seen that signals 13 and 13' are different signals. However, since they occur at the same time they are shown in FIG. 6 as the same signals. The output signal 17 of one-shot multivibrator 99 is applied to the write command input of "baudot" data input shift register 149. It should be noted, as shown in the data processing timing diagram of FIG. 6, that the "baudot" information is presented to the input of "baudot" data input shift register 149 during the 10 μs time duration of signal 13' and that the write command is the 2 μs signal 17 that is coincident with signal 13'. In this matter each new increment of data is transferred into shift register 149.

In FIG. 9 is illustrated a schematic diagram of the first in first out storage system 49 of FIG. 3. Storage system 49 includes a "baudot" data input shift register 149 the output of which is connected to the input of a first in first out storage buffer 163. The output of storage buffer 163 is connected to the input of "baudot" data output shift register 165. The output of shift register 165 is applied to the inputs of teletype shift register 51 and to magnetic tape recorder 57. The output of 104 ms teletype clock 59 is applied to the control input of teletype machine 55 and to the input of one-shot multivibrator 167 that is responsive to the leading edge of the clock signal and has a time duration of 2 μs. The output of multivibrator 167 is connected to the read command input of output shift register 165.

Signal 17, from one-shot multivibrator 99 of FIG. 8B, is applied to the write command inputs of input shift register 149 and output shift register 165. AND gate 171 has signal 7 and signal 19 from clock 89 of FIG. 7 connected to its inputs and the output signal 20 thereof is connected to the $\phi_1$ clock input of input shift register 149. AND gate 173 has signal 8 and signal 19 connected to its inputs and the output signal 21 thereof is connected to $\phi_2$ clock input of shift register 165. The timing diagram of these signals is shown in FIG. 6 and results in the shifting in and shifting out of the registers and buffer the 5 bit words of the data and control signals.

It should be particularly noted that the first in first out storage buffer 163 can store up to about sixty-four 5 bit words. This represents a sufficient capacity to store the 4.6 seconds delay of reading the first 100 data points. This information is then shifted out during the 4 second periods after measuring data points 101 and 102.

In FIGS. 10A and 10B is illustrated the schematic diagram of the teletype and information code generator 61 of FIGS. 3 and 8B and in FIG. 11 is illustrated the timing diagram for the generator 61. The generator 61 includes a ring counter 181 that has thirty-three stages of serially connected flip-flop devices 1 through 33. When the breach of the launcher is closed, as generally indicated by reference numeral 183, there is provided an output signal 22 having a time duration of 1 μs. This output signal is applied to the set input of flip-flop device 185 having an output signal 23 that is applied to the enable input of flip-flop 187 along with signal 18 from divide by 4 circuit 90 of control circuits 41 of FIG. 7 which is applied to the clock input thereof. The output signal 24 from flip-flop 187 is applied to the input of one-shot multivibrator 188 having a time duration of 16 μs. The output signal 24 from multivibrator 188 is applied to the set input of ring counter 181 along with signal 18 which is applied to the clock input thereof. The output of the last stage (stage 33) of the ring counter is applied to the input of 20 ns flip-flop 189. The output signal 26 of flip-flop 189 is applied to the input of amplifier 191. The output signal 27 of amplifier 191 is applied to the reset input of ring counter 181 to reset the ring counter after a cycle of operation. The outputs of stages 8, 9, 10, 11, 15, 16, 17, 18, 20, 21, 22, 23, 24, 26, 27, 28, 29 and 30 of ring counter 181 are respectively applied to the gating inputs of 4 bit binary digit switches 201 through 218. These 4 bit binary digit switches are preferably manually controlled so the operator can manually select the information pertaining to day, month, hour, minute, earth's quadrant, latitude (degrees and minutes) and longitude (degrees and minutes) as indicated in FIGS. 2, 10A and 10B. The 4 bit outputs of selector switches 201 through 218 are applied in parallel to AND gates 113, 115, 117 and 119 of FIG. 8A as indicated. The outputs of stage 1 (Letters—L) of stages 2, 3, 4, 5 (SHIPS CODE ID), stage 6 (Figures or numbers—F), stages 7, 13, 19, 25, 31 (Space S), and stages 12, 14 (YEAR YR) are applied to the indicated inputs of character generator 47 of FIG. 8B. The outputs of stages 32 and 33 are respectively applied to OR gates 219 and 221 of FIG. 8A.

Referring to the timing diagram of FIG. 11 the closure of launcher breach 183 results in signal 22 which may occur at any point in time during the running of free running clock 89 of FIG. 7 as indicated by signal 18. The trailing edge of signal 22 causes flip-flop 185 to generate signal 23 which remains up for the complete information cycle. The trailing edge of signal 18 along with the enable signal 23 causes the generation of signal 24 which stays up for the complete information cycle. The leading edge of signal 24 causes the generation of signal 25 which has a time duration of 16 $\mu$s. It should be particularly noted that the leading edge of signal 25 is coincident with the trailing edge of signal 18 and that signal 25 extends past the leading edge of the next clock half period since signal 16 has a 16 $\mu$s duration and the clock half period is 14.4 $\mu$s. Therefore, it can be seen that first stage of the ring counter 181 will be set at the leading edge of the clock signal 18 as indicated by the notations in FIG. 11. The remaining stages of ring counter 181 will be serially set with the leading edge of each succeeding clock pulse. It should be noted that if the breach closure signal 22 occurred during the next half period of the clock pulse 18 (the low level half period) then signal 25 would occur during the next clock period.

The output of flip-flop 189 is also connected to the input of flip-flop 193 the output signal 28 of which is applied to one of the inputs of AND gate 76 of FIG. 7. When flip-flop 193 is actuated then the output signal from AND gate 76 causes the system to activate for one data point which is the actual or calibration temperature output of analog signal sampler 27 of FIG. 3.

Referring to FIG. 10B the carriage return (CR) and line feed (LF) signals are obtained by applying signals 11 and 29 to the inputs of AND gate 222 the output of which is applied to the input of OR gate 223 along with signal 12. The output of OR gate 223 is applied to the input of carriage return and line feed generator 225 the output signals, as indicated in FIG. 10, of which are applied to the CR and LF inputs of character generator 47 of FIG. 8B.

After the completion of the above described operation the temperature probe is launched and data is then processed as previously explained.

The (S), (;) and (/) signals are otained by applying signal 12 to the input of 10 unit counter 227 the output of which is connected to the respective inputs of AND gates 229, 231 and 233. Signal 10 is applied to the input of one-shot multivibrator 235 the output of which is connected to the other inputs of AND gates 229, 231 and 233. The outputs of AND gates 229, 231 and 233 are respectively the (S), (;) and (/) signals that are applied to the (S), (;) and (/) inputs of character generator 47 of FIG. 8B.

In view of the foregoing, it can be seen that an effective, reliable and unique information processing system is provided that is suitable for use with ocean temperature mapping and teletype operations.

What is claimed is:

1. An information processing system comprising:
   (a) first means for receiving and storing first digital information having a first format and representing first decimal members;
   (b) second means for generating second digital information having said first format and representing second decimal numbers;
   (c) third means for selectively transferring the output of said first means and the output of said second means;
   (d) fourth means for converting said first and second digital information having said first format into decimal information;
   (e) fifth means for generating signals representing non numeric information;
   (f) sixth means for converting said decimal information and non numeric information into third digital information having a second format;
   (g) the outputs of said first and second means being operably connected to the input of said third means, the output of said third means being operably connected to the input of said fourth means, the output of said fourth and fifth means connected to the input of said sixth means;
   (h) control means for sequentially transferring said first and second digital information from said first and second means to said third means, for transferring said first and second digital information from said third means to said fourth means, for transferring said decimal information from said fourth means and said non numeric information from said fifth means to said sixth means;
   (i) the output of said sixth means being operably connected to processing means;
   (j) seventh means for generating decimal numeric information;
   (k) eighth means operably connected between said fourth and sixth means and to the output of said seventh means for selectively transferring the output of said fourth means and said seventh means to said sixth means;
   (l) a ring counter including a first group of stages, a second group of stages, and a third group of stages;
   (m) a plurality of binary digit switches; and
   (n) said second means including said first group of stages and said plurality of binary digit switches wherein the outputs of said first group of stages are respectively connected to the inputs of said plurality of binary digit switches and the outputs of said plurality of binary digit switches are connected to the input of said third means.

2. The information processing system of claim 1 wherein:
   (a) said fifth means includes said second group of stages the outputs of which are connected to the input of said sixth means.

3. The information processing system of claim 2 wherein:
   (a) said seventh means includes said third group of stages the outputs of which are connected to the input of said eighth means.

4. The information processing system of claim 3 wherein:
   (a) said fifth means includes a carriage return and line signal generator and a teletype control generator for a space, a start of new line for data points having first predetermined time intervals, and a start of new line for data points having second predetermined time intervals.

5. The information processing system of claim 4 wherein:
  (a) said processing means includes first in first out storage means and readout means;
  (b) the output of said sixth means being connected to the input of said storage means the output of which is connected to the input of said readout means; wherein
  (c) said control means includes a first clock pulse generator for generating first clock pulses for transferring said first digital information at a first rate; and
  (d) the readout rate of said readout means being less than said first rate of said first clock pulses.

6. The information processing system of claim 5 wherein:
  (a) said control means includes a second clock pulse generator for generating second clock pulses for transferring said first digital information at a second rate; and
  (b) said second rate of said second clock pulses being less than said first rate and less than said readout rate.

* * * * *

UNITED STATES PATENT AND TRADEMARK OFFICE
CERTIFICATE OF CORRECTION

PATENT NO. : 4,202,040

DATED : May 6, 1980

INVENTOR(S) : Eddie L. WHITWORTH and Ronald G. RUSSELL

It is certified that error appears in the above-identified patent and that said Letters Patent are hereby corrected as shown below:

For each occurrence of the registered trademark "Teletype", please substitute the word "teletypewriter" or its proper variant.

Signed and Sealed this

Seventeenth Day of March 1981

[SEAL]

Attest:

RENE D. TEGTMEYER

Attesting Officer     Acting Commissioner of Patents and Trademarks